(12) United States Patent
Zhou et al.

(10) Patent No.: US 12,046,007 B2
(45) Date of Patent: Jul. 23, 2024

(54) METHOD FOR PROCESSING EVENT DATA FLOW AND COMPUTING DEVICE

(71) Applicant: OmniVision Sensor Solution (Shanghai) Co., Ltd, Shanghai (CN)

(72) Inventors: Yueyin Zhou, Shanghai (CN); Hua Ren, Shanghai (CN)

(73) Assignee: OMNIVISION SENSOR SOLUTION (SHANGHAI) CO., LTD, Shanghai (CN)

(*) Notice: Subject to any disclaimer, the term of this patent is extended or adjusted under 35 U.S.C. 154(b) by 297 days.

(21) Appl. No.: 17/555,800

(22) Filed: Dec. 20, 2021

(65) Prior Publication Data

US 2022/0114757 A1 Apr. 14, 2022

Related U.S. Application Data

(63) Continuation of application No. PCT/CN2019/093215, filed on Jun. 27, 2019.

(30) Foreign Application Priority Data

Jun. 21, 2019 (CN) .......................... 201910542348.6

(51) Int. Cl.
| | |
|---|---|
| *H04N 23/68* | (2023.01) |
| *G01C 19/5783* | (2012.01) |
| *G01C 25/00* | (2006.01) |
| *G06T 7/80* | (2017.01) |
| *H04N 25/47* | (2023.01) |

(52) U.S. Cl.
CPC ............ *G06T 7/80* (2017.01); *G01C 19/5783* (2013.01); *G01C 25/005* (2013.01); *H04N 23/6812* (2023.01); *H04N 23/683* (2023.01); *H04N 25/47* (2023.01)

(58) Field of Classification Search
CPC ...... H04N 25/47; H04N 25/707; H04N 23/68; H04N 23/681; H04N 23/6812; H04N 23/682
USPC .................................................... 348/208.99
See application file for complete search history.

(56) References Cited

U.S. PATENT DOCUMENTS

| | | | | |
|---|---|---|---|---|
| 2018/0098082 | A1* | 4/2018 | Burns | H04N 19/54 |
| 2018/0174323 | A1* | 6/2018 | Ji | G06T 7/74 |
| 2019/0096068 | A1* | 3/2019 | Fontanel | G06T 7/20 |

(Continued)

FOREIGN PATENT DOCUMENTS

| | | |
|---|---|---|
| CN | 107018357 A | 8/2017 |
| CN | 108205679 A | 6/2018 |

(Continued)

*Primary Examiner* — Anthony J Daniels
(74) *Attorney, Agent, or Firm* — IPRO, PLLC

(57) ABSTRACT

The present invention discloses a processing method of an event data stream, which is from a dynamic vision sensor, the method comprises steps of: acquiring inertial measurement parameters, which corresponds to one segment of the event data stream for generating one frame of image; determining attitude angle data based on the acquired inertial measurement parameters and calibration parameters of the dynamic vision sensor; generating a transformation matrix based on the determined attitude angle data; processing the one segment of the event data stream using the transformation matrix, to generate the processed event data stream. The present invention also discloses a corresponding computing apparatus.

16 Claims, 7 Drawing Sheets

(56) References Cited

U.S. PATENT DOCUMENTS

2019/0096081 A1      3/2019  Gupta et al.
2019/0200862 A1*     7/2019  Krueger .............. A61B 5/6803
2019/0356849 A1*    11/2019  Sapienza ............. G06V 20/10

FOREIGN PATENT DOCUMENTS

CN         108827299 A      11/2018
EP           3451288 A1 *    3/2019   ........... G06K 9/4661

* cited by examiner

METHOD FOR PROCESSING EVENT DATA FLOW AND COMPUTING DEVICE

TECHNICAL FIELD

The present invention relates to a technical field of data processing, and in particular to a processing scheme for an event data stream.

BACKGROUND

A dynamic vision sensor (DVS) is a biomimesis vision sensor that simulates the human retina which is based on pulse-triggered neurons. Each pixel unit in the sensor can independently and autonomously make a response and record areas in which light intensity changes rapidly, by adopting an event-triggered processing mechanism, its output is no longer an image frame, but asynchronous digital event stream. This sensor may also output data of nine-axis Inertial measurement unit (IMU) in total, including accelerometer, gyro and magnetometer, while the asynchronous digital event stream is output.

In order to improve the speed of optical flow calculation, in the existing scheme, one frame of image is established through the event data stream output by the dynamic vision sensor. However, the picture will shake due to motion of the dynamic vision sensor itself. Therefore, it is need to solve a problem of shake of the generated picture by means of a motion compensation scheme.

A traditional IMU compensation scheme based on Visual-Inertial Odometry (VIO) mainly operates on a whole image, calculates a corresponding transformation matrix by obtaining the one frame of image and combined with corresponding IMU data, and then obtains corresponding pose estimation to solve the problem of shake of the picture. At the same time, an edge sharpening algorithm of DVS now performs estimation by mainly depending on a depth of field of a target, but such algorithm generally has high complexity and larger time-consumption.

In view of this, a scheme that can process the event data stream of DVS quickly and accurately is needed.

SUMMARY

The present invention provides a processing method and a computing apparatus of an event data stream, to solve or at least alleviate at least one above problem in an effort.

According to one aspect of the present invention, a processing method of an event data stream is provided, the event data stream is from a dynamic vision sensor, and the method comprises steps of: acquiring inertial measurement parameters, which corresponds to one segment of the event data stream for generating one frame of image; determining attitude angle data based on the acquired inertial measurement parameters and calibration parameters of the dynamic vision sensor; generating a transformation matrix based on the determined attitude angle data; and processing the one segment of the event data stream using the transformation matrix, to generate the processed event data stream.

Alternatively, the method according to the present invention further comprises a step of: generating the image containing motion information using the processed event data stream which is generated.

Alternatively, in the method according to the present invention, the step of acquiring the inertial measurement parameters, which corresponds to the one segment of the event data stream for generating the one frame of image comprises: determining whether a first duration of generating the one frame of image is consistent with a second duration of outputting one group of inertial measurement parameters; acquiring two groups of inertial measurement parameters within a time period corresponding to the first duration or the second duration, if the first duration is consistent with the second duration; acquiring a plurality of groups of inertial measurement parameters within a time period corresponding to the first duration, if the first duration is inconsistent with the second duration and the first duration is an integral multiple of the second duration; acquiring a plurality of groups of inertial measurement parameters within a time period greater than that corresponding to the first duration, and performing interpolation by using the acquired inertial measurement parameters to obtain a plurality of groups of inertial measurement parameters within a time period corresponding to the first duration if the first duration is inconsistent with the second duration and the first duration is not an integral multiple of the second duration.

Alternatively, in the method according to the present invention, the step of determining the attitude angle data based on the acquired inertial measurement parameters and the calibration parameters of the dynamic vision sensor comprises: determining the attitude angle data corresponding to each group of inertial measurement parameters within the first duration, respectively, based on the calibration parameters and the each group of inertial measurement parameters.

Alternatively, in the method according to the present invention, the step of generating the transformation matrix based on the determined attitude angle data further comprises: calculating difference values of the attitude angle data corresponding to the each group of inertial measurement parameters, respectively, to obtain at least one attitude angle difference value; generating at least one transformation matrix based on the at least one calculated attitude angle difference value.

Alternatively, in the method according to the present invention, the step of processing the one segment of the event data stream using the transformation matrix, to generate the processed event data stream comprises: processing a location of at least one event data in the event data stream using the at least one generated transformation matrix, to generate the processed location of the event data, respectively.

Alternatively, in the method according to the present invention, the inertial measurement parameters comprise three-axis data of a gyro, three-axis data of an accelerometer and three-axis data of a magnetometer.

Alternatively, in the method according to the present invention, the step of determining the attitude angle data based on the acquired inertial measurement parameters and the calibration parameters of the dynamic vision sensor further comprises: processing the acquired inertial measurement parameters by using the calibration parameters of the dynamic vision sensor, to obtain the processed inertial measurement parameters, the processed inertial measurement parameters comprising the processed three-axis data of the gyro, the processed three-axis data of the accelerometer and the processed three-axis data of the magnetometer; processing the processed three-axis data of the gyro by adopting time difference integration, to generate a attitude angle of the gyro; processing distribution of the processed three-axis data of the accelerometer and the processed three-axis data of the magnetometer by adopting a trigonometric function, to generate a attitude angle of the accelerometer and a attitude angle of the magnetometer, respectively; processing the attitude angle of gyro, the attitude angle of the accelerometer and the attitude angle of the magnetometer based on complementary filtering, respectively, to generate a final attitude angle.

Alternatively, in the method according to the present invention, the step of calculating the difference values of the attitude angle data corresponding to the each group of inertial measurement parameters, respectively, to obtain the at least one attitude angle difference value comprises: calculating difference values between attitude angle data of a first group of inertial measurement parameters and attitude angle data of each of other groups of inertial measurement parameters, respectively.

Alternatively, the method according to the present invention further comprises a step of: calibrating the dynamic vision sensor to determine the calibration parameters of the dynamic vision sensor.

Alternatively, in the method according to the present invention, the step of calibrating the dynamic vision sensor to determine the calibration parameters of the dynamic vision sensor comprises: performing camera parameter calibration on the dynamic vision sensor to determine a central pixel location and focal length parameters corresponding to the dynamic vision sensor; performing inertial measurement unit calibration on the dynamic vision sensor to determine the inertial calibration parameters.

Alternatively, in the method according to the present invention, the transformation matrix is generated according to the following formula:

$$\underset{2\times 3}{warpMatrix} = \begin{bmatrix} \cos(\Delta roll) & \sin(\Delta roll) & (1-\cos(\Delta roll))\cdot cx - \sin(\Delta roll)\cdot cy - \dfrac{1}{\arctan\left(\dfrac{1}{f}\right)}\cdot \Delta pan \\ -\sin(\Delta roll) & \cos(\Delta roll) & \sin(\Delta roll)\cdot cx + (1-\cos(\Delta roll))\cdot cy - \dfrac{1}{\arctan\left(\dfrac{1}{f}\right)}\cdot \Delta tilt \end{bmatrix}$$

wherein, $\Delta roll$, $\Delta pan$, and $\Delta tilt$ are attitude angle difference values, and cx, cy, and f represent the image center pixel location and the focal length, respectively.

Alternatively, in the method according to the present invention, the step of processing the one segment of the event data stream using the transformation matrix comprises:

x_compensated=warpMatrix(0,0)·x+warpMatrix(0,1)·y+warpMatrix(0,2)

y_compensated=warpMatrix(1,0)·x+warpMatrix(1,1)·y+warpMatrix(1,2)

wherein, x and y are locations of original event data, x_compensated and y_compensated are the processed locations of the event data.

According to another aspect of the present invention, there is provided a dynamic vision sensor, comprising: an event detection unit suitable for outputting an event data stream; an inertial measurement unit suitable for outputting inertial measurement parameters; and a motion compensation unit coupled with the event detection unit and the inertial measurement unit, respectively, and suitable for processing the event data stream based on the inertial measurement parameters, to generate the processed event data stream.

Alternatively, the dynamic vision sensor according to the present invention further comprises: a framing unit is coupled with the motion compensation unit and is suitable for generating the image containing motion information according to the processed event data stream.

According to another aspect of the present invention, there is provided a computing apparatus comprising: one or more processors; and a memory; one or more programs, wherein the one or more programs are stored in the memory and configured to be executed by the one or more processors, and the one or more programs include instructions for executing any one of the methods described above.

According to another aspect of the present invention, there is provided a computer-readable storage medium storing one or more programs, the one or more programs comprises instructions, the instructions, when being executed by a computing apparatus, cause a computing apparatus to execute any of the methods described above.

To sum up, according to the scheme of the present invention, in which the attitude angle data is calculated through the obtained inertial measurement parameters, and then the event data stream output by the dynamic vision sensor is processed using the attitude angle data, this algorithm is simple and effective, and does not make an estimation depending on the depth of field of the target, thus will not produce serious time-consumption.

Meanwhile, the image generated based on the processed event data stream can effectively reduce tailing phenomenon and keep imaging clear.

BRIEF DESCRIPTION OF FIGURES

In order to achieve the above and related purposes, certain illustrative aspects are described herein in combination with the following description and drawings. These aspects indicate various ways in which the principles disclosed herein may be practiced, and all aspects and their equivalent aspects are intended to fall within the scope of the claimed subject matters. The above and other objects, features and advantages of the present disclosure will become more apparent by reading the following detailed description in combination with the accompanying drawings. Throughout the present disclosure, the same reference numerals generally refer to the same parts or elements.

DETAILED DESCRIPTION

Exemplary embodiments of the present disclosure will be described in more detail below with reference to the accompanying drawings. Although the exemplary embodiments of the present disclosure are shown in the accompanying drawings, it should be understood that the present disclosure may be implemented in various forms and should not be limited by the embodiments set forth herein. On the contrary, these embodiments are provided to enable a more thorough understanding of the present disclosure and fully conveying the scope of the present disclosure to those skilled in the art.

In recent years, a dynamic vision sensor (DVS) has attacted more and more attention and applications in a field of computer vision. DVS is a biomimesis vision sensor that simulates the human retina which is based on pulse-triggered neurons. The sensor has an array of pixel units composed of a plurality of pixel units, in which each pixel unit makes a response and records areas in which light intensity changes rapidly, only when it senses the change of the light intensity. The specific composition about the dynamic vision sensor is not described too much here. Since DVS adopts an event-triggered processing mechanism, its output is an asynchronous event data stream, which is, for example, light intensity change information (such as a light intensity threshold and a timestamp of light intensity change) and coordinate locations of the triggered pixel units.

Figure 1:
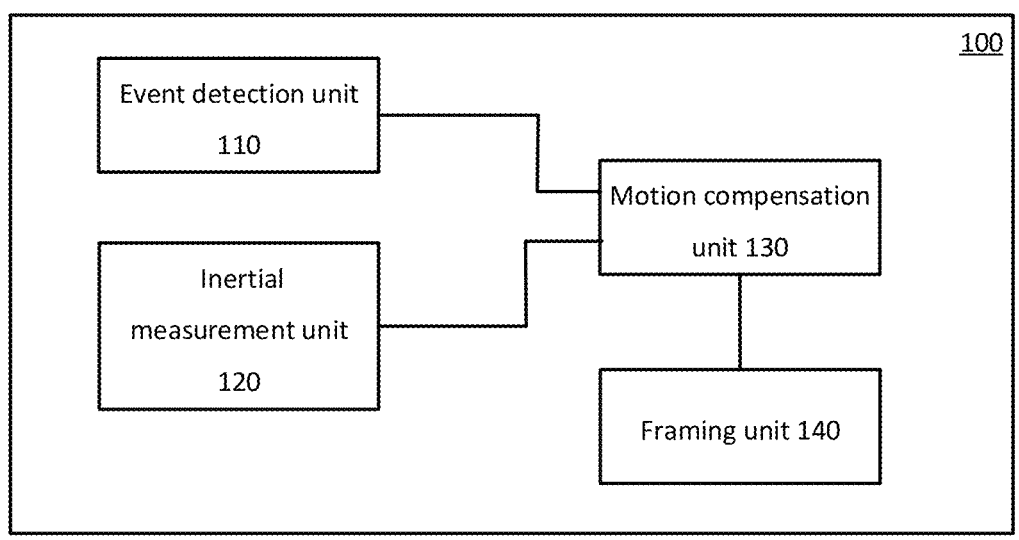
FIG. 1 shows a schematic diagram of a dynamic vision sensor 100 according to some embodiments of the present invention.

FIG. 1 shows a schematic diagram of a dynamic vision sensor 100 according to one embodiment of the present invention. As shown in FIG. 1, the dynamic vision sensor 100 includes an event detection unit 110 for outputting an event data stream, an inertial measurement unit 120 for outputting inertial measurement parameters, and a motion compensation unit 130. The motion compensation unit 130 is coupled with the event detection unit 110 and the inertial measurement unit 120, respectively, and processes the event data stream based on the inertial measurement parameters, and more specifically, processes a location of each event data in the event data stream to generate the processed event data stream.

In the embodiment according to the present invention, the event detection unit 110 detects a motion change in a field of view in real time, and once it detects that an object in the field of view moves relative to the dynamic vision sensor 100 (that is, light changes), a pixel event (or referred to as "event" for short) will be triggered and the event data of dynamic pixels (that is, pixel units with brightness change) is output, and the several event data output within a period of time constitute the event data stream. Each event data in this event data stream includes at least coordinate locations of the triggered events (that is, the pixel units with brightness change) and timestamp information when triggered. In some embodiments of the present invention, the processing of the event data is the processing of the coordinate locations of the event data, so as to achieve an effect of motion compensation.

The inertial measurement unit 120 contains a gyro, an accelerometer and a magnetometer. Wherein the accelerometer detects an acceleration signal of an object in a Body Frame System, the gyro detects an angular velocity signal of a carrier with respect to a Navigation Coordinate System, and the magnetometer detects strength and direction of a magnetic field. Generally, the inertial measurement parameters output via the inertial measurement unit 120 contain three-axis data of the gyro, three-axis data of the accelerometer and three-axis data of the magnetometer, i.e., nine-axis IMU data in total.

According to one embodiment, the dynamic vision sensor 100 further includes a framing unit 140 in addition to the event detection unit 110, the inertial measurement unit 120 and the motion compensation unit 130. As shown in FIG. 1, this framing unit 140 is coupled with the motion compensation unit 130 to generate an image containing motion information according to the processed event data stream. The generated image can not only represent motion situation (such as motion direction and motion speed) in the field of view, but also avoid a problem of image tailing caused by the motion of the dynamic vision sensor itself.

The specific process of motion compensation by the motion compensation unit 130 for the event data stream will be described in detail below. According to one embodiment, the motion compensation unit 130 may be implemented by a computing apparatus.

Figure 2:
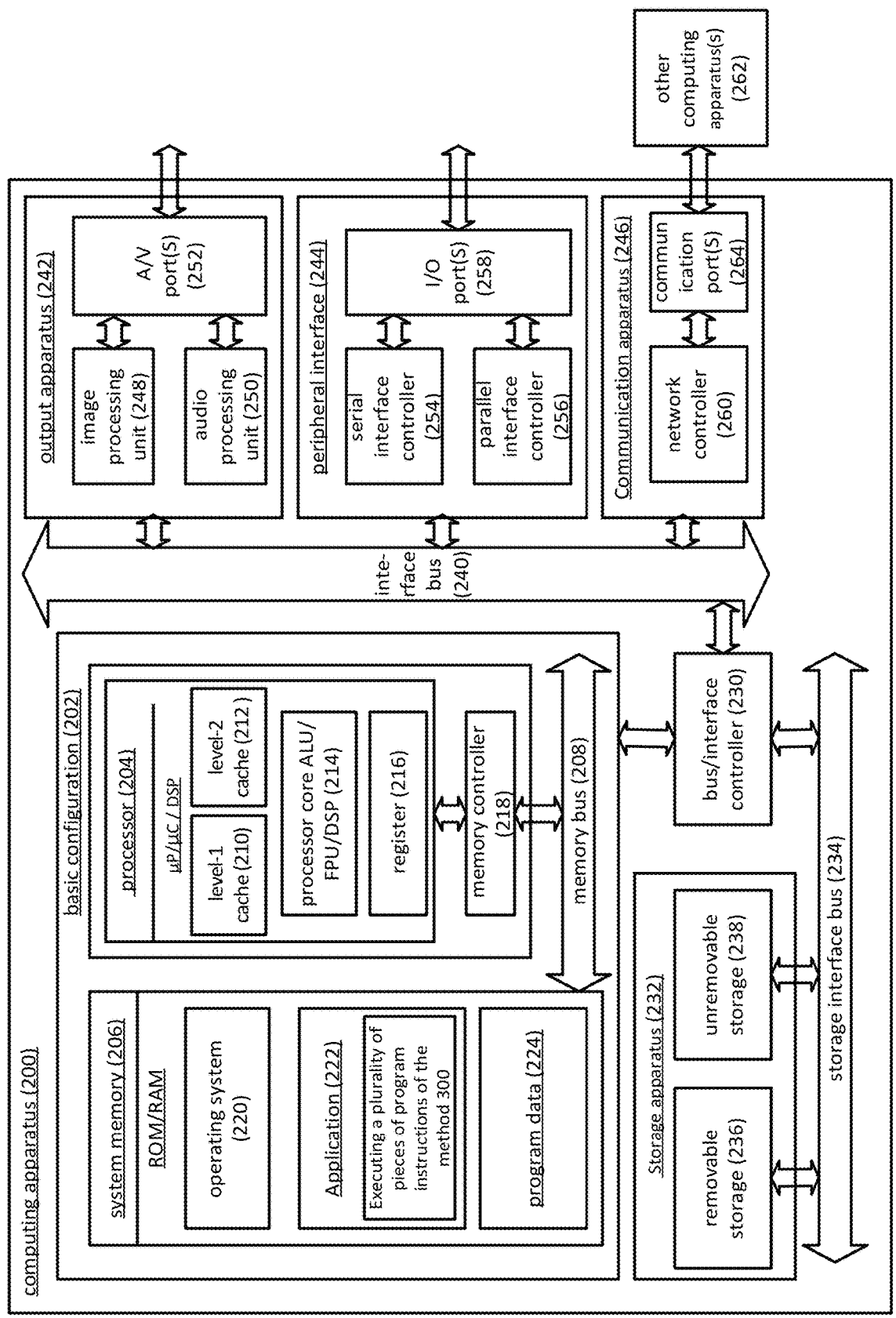
FIG. 2 shows a schematic diagram of a computing apparatus 200 according to some embodiments of the present invention.

FIG. 2 is a schematic block diagram of an example computing apparatus 200.

As shown in FIG. 2, in a basic configuration 202, the computing apparatus 200 typically includes a system memory 206 and one or more processors 204. A memory bus 208 may be used to a communication between the processors 204 and the system memory 206.

Depending on a desired configuration, the processors 204 may be any type of processor including, but is not limited to, a microprocessor (μP), a microcontroller (μC), a digital information processor (DSP), or any combination thereof. The processors 204 may include one or more levels of caches such as level 1 cache 210 and level 2 cache 212, a processor core 214, and a register 216. The exemplary processor core 214 may include an arithmetic logic unit (ALU), a float point unit (FPU), a digital signal processor core (DSP core), or any combination thereof. The exemplary memory controller 218 may be used with the processors 204, or in some implementations, the memory controller 218 may be an internal part of the processor 204.

Depending on the desired configuration, the system memory 206 may be any type of memory including, but not limited to, a volatile memory (such as RAM) and a non-volatile memory (such as ROM, flash memory, etc.) or any combination thereof. The system memory 206 may include an operating system 220, one or more applications 222, and program data 224. In some embodiments, the applications 222 may be arranged to execute instructions on the operating system by the one or more processors 204 using the program data 224.

The computing apparatus 200 may also include an interface bus 240 that facilitates communication from various interface apparatuses (for example, an output apparatus 242, a peripheral interface 244, and a communication apparatus 246) to the basic configuration 202 via a bus/interface controller 230. The exemplary output apparatus 242 includes a graphics processing unit 248 and an audio processing unit 250. They may be configured to facilitate communication with various external apparatuses such as a display or a speaker via one or more A/V ports 252. The exemplary peripheral interface 244 may include a serial interface controller 254 and a parallel interface controller 256, and the serial interface controller 254 and the parallel interface controller 256 may be configured to facilitate communication via one or more I/O ports 258 and other peripheral apparatuses such as input apparatuses (e.g., a keyboard, a mouse, a pen, a voice input apparatus, a touch input apparatus) or other peripherals (e.g. a printer, a scanner, etc.). The exemplary communication apparatus 246 may include a network controller 260, which may be arranged to facilitate communication with one or more other computing apparatuses 262 through a network communication link via one or more communication ports 264.

The network communication link may be an example of a communication medium. The communication medium may generally be embodied as computer-readable instructions, data structures, program modules in a modulated data signal such as a carrier wave or other transmission mechanism, and may include any information delivery medium. The "modulated data signal" may be a signal in which change of one or more of its data set, or its change may be performed in a manner of encoding information in the signal. As a non-limiting example, the communication medium may include a wired medium such as a wired network or a private wire network, and various wireless media such as sound, radio frequency (RF), microwave, infrared (IR), or other wireless media. The term of computer-readable medium used herein may include both a storage medium and the communication medium.

Generally, the computing apparatus 200 may be implemented as a part of a small-size portable (or mobile) electronic apparatus, which may be, such as a cellular phone, a digital camera, a personal digital assistant (PDA), a personal media player apparatus, a wireless network browsing apparatus, a personal headset apparatus, a application special apparatus, or a hybrid apparatus that may comprise any of the above functions. In one embodiment of the present invention, the computing apparatus 200 may be implemented as a micro computing module, etc. The embodiments of the present invention are not limited to this.

In the embodiment according to the present invention, the computing apparatus 200 is configured to perform a processing method 300 of the event data stream according to the present invention. Wherein the applications 222 of the computing apparatus 200 include a plurality of pieces of program instructions of executing the method 300 according to the present invention.

Figure 3:
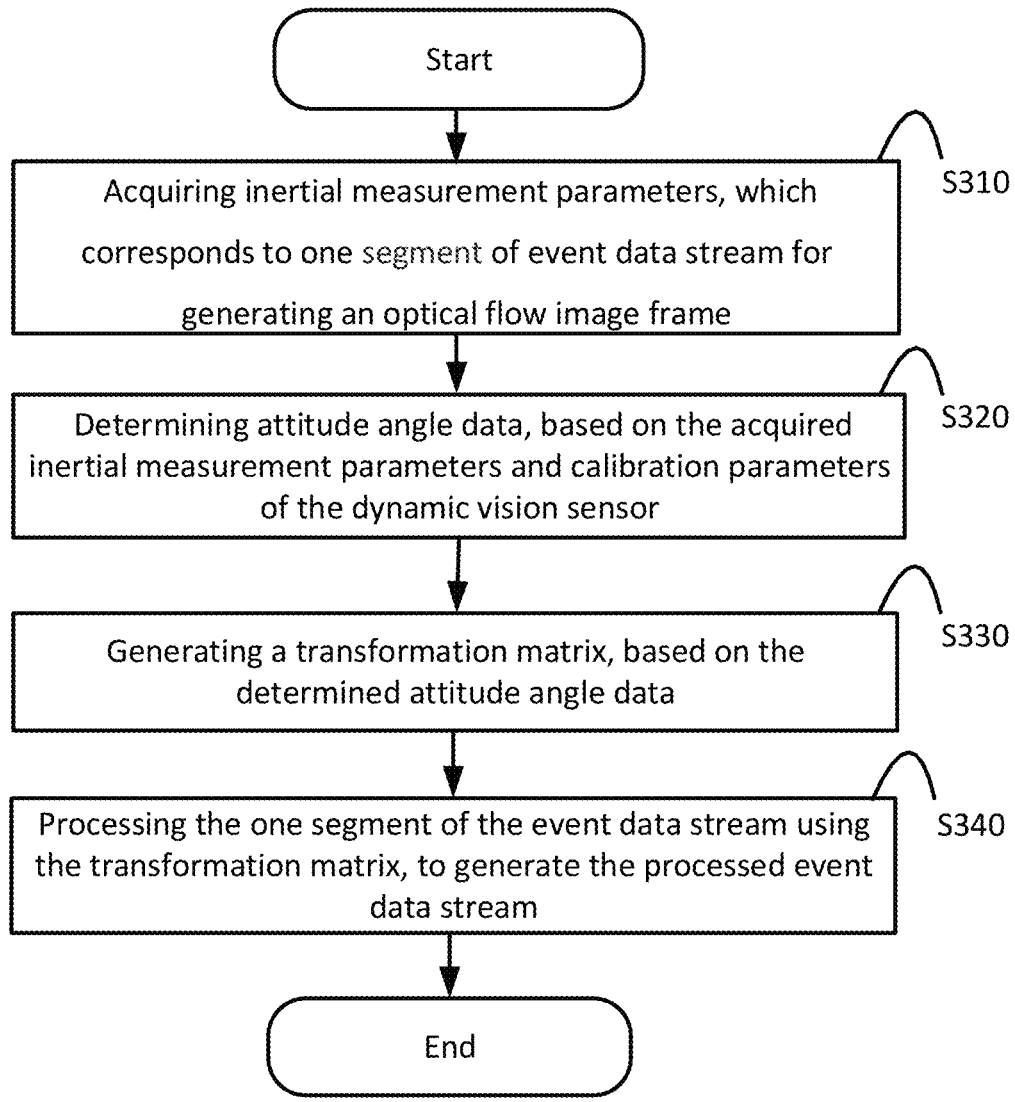
FIG. 3 shows a flowchart of a processing method 300 of an event data stream according to one embodiment of the present invention.

FIG. 3 shows a flowchart of a processing method 300 of an event data stream according to one embodiment of the present invention. As shown in FIG. 3, the method 300 begins at step S310.

In step S310, inertial measurement parameters, which corresponds to one segment of the event data stream for generating one frame of image, are acquired.

Figure 4A:
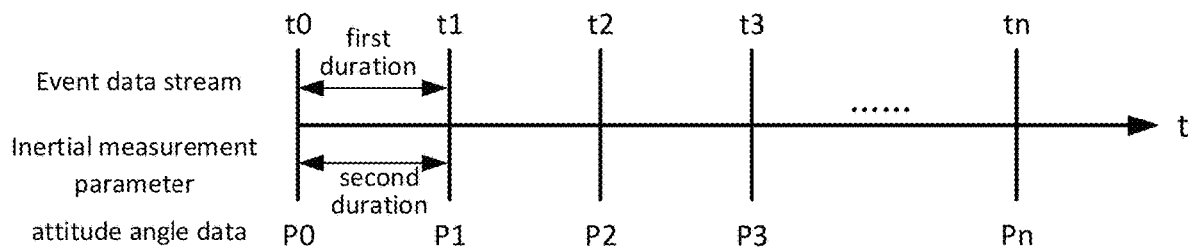
FIGS. 4A to 4C show schematic diagrams of relationship between a first duration and a second duration according to some embodiments of the present invention.
Figure 4B:
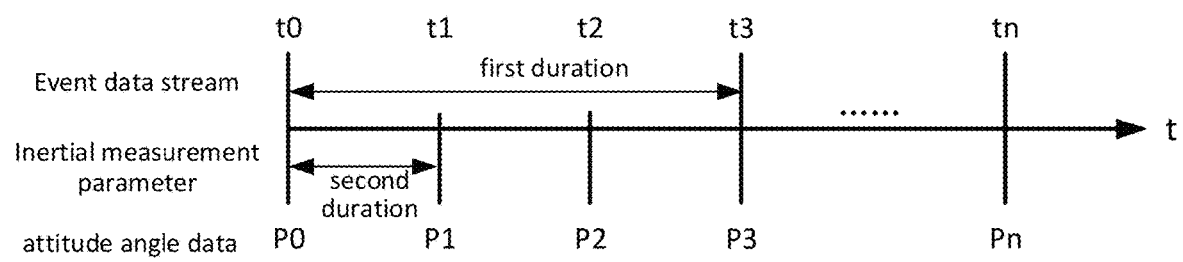
Figure 4C:
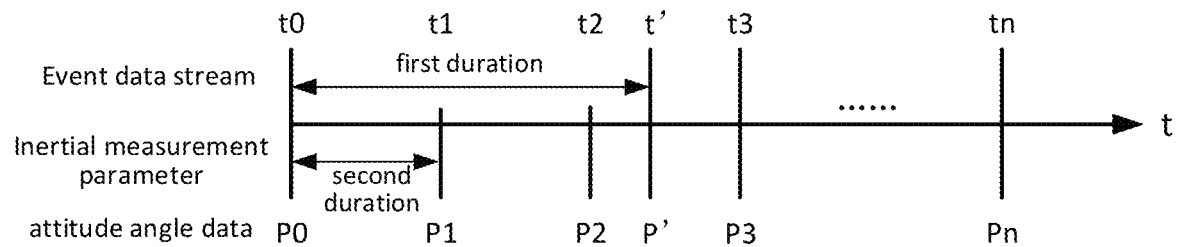

According to one embodiment of the present invention, a dynamic vision sensor 100 continuously outputs the event data stream, and generates the one frame of image using the event data stream of a first duration. Meanwhile, the dynamic vision sensor 100 outputs one group of inertial measurement parameters every second duration (alternatively, a second duration may be determined by the output frequency of the inertial measurement parameters). The first duration and the second duration are not necessarily equal. FIGS. 4A to 4C show schematic diagrams of relationship between the first duration and the second duration according to some embodiments of the present invention. As shown in FIGS. 4A to 4C, t is a time axis, and the first duration for generating the one frame of image is shown above the time axis, the second duration for outputting the one group of inertial measurement parameters is shown below the time axis. In FIGS. 4A-4C, the second duration remains constant, which is always 10 ms, but the first duration is 10 ms, 30 ms and 25 ms, respectively. At this time, according to the corresponding relationship between the first duration and the second duration, inertial measurement parameters within the first duration (i.e., corresponding to a segment of the event data stream for generating frame by frame image) are acquired.

According to one embodiment, whether the first duration of generating one frame of image is consistent with the second duration of outputting one group of inertial measurement parameters is determined firstly. (1) Two groups of inertial measurement parameters within a time period corresponding to the first duration or the second duration are acquired, if the first duration is consistent with the second duration. As shown in FIG. 4A, the first duration and the second duration both are 10 ms, then two groups of inertial measurement parameters correspondingly output at t0 moment and t1 moment are acquired in a t0-t1 time period (i.e., the first duration), and similarly, two groups of inertial measurement parameters correspondingly output at t1 moment and t2 moment are obtained in a t1-t2 time period (that is, the first duration), and so on. (2) A plurality of groups of inertial measurement parameters within the time period corresponding to the first duration are acquired, if the first duration is inconsistent with the second duration and the first duration is an integral multiple of the second duration. As shown in FIG. 4B, the first duration is 30 ms and the second duration is 10 ms, then four groups of inertial measurement parameters correspondingly output at t0 moment, t1 moment, t2 moment and t3 moment are acquired in a t0-t3 time period (that is, the first duration). (3) If the first duration is inconsistent with the second duration and the first duration is not an integral multiple of the second duration, a plurality of groups of inertial measurement parameters within a time period greater than that corresponding to the first duration are acquired, and a plurality of groups of inertial measurement parameters within the time period corresponding to the first duration are obtained by an interpolation using the acquired inertial measurement parameters. As shown in FIG. 4C, the first duration is 25 ms, the second duration is 10 ms, the inertial measurement parameters output correspondingly at t' moment cannot be directly acquired within the t0-t' time period (i.e., the first duration), and at this time, the inertial measurement parameters output correspondingly at two moments of the front moment and the rear moment of t' (i.e., t2 and t3) may be used to perform an interpolation to obtain the inertial measurement parameters at t' moment. In other words, four groups of inertial parameters within a time period (i.e., the t0-t3 time period) greater than that corresponding to the first duration are acquired firstly, and then the inertial measurement parameters at t' moment are obtained in a manner of interpolation based on the inertial measurement parameters output at t2 moment and t3 moment, and finally, four groups of inertial measurement parameters output correspondingly at t0 moment, t1 moment, t2 moment and t' moment are obtained. It needs to be noted that the embodiments of the present invention do not make specific restrictions on the manner of interpolation, for example, simple linear interpolation is adopt, but is not limited to this.

Then, in step S320, attitude angle data is determined based on the acquired inertial measurement parameters and calibration parameters of the dynamic vision sensor.

Figure 5:
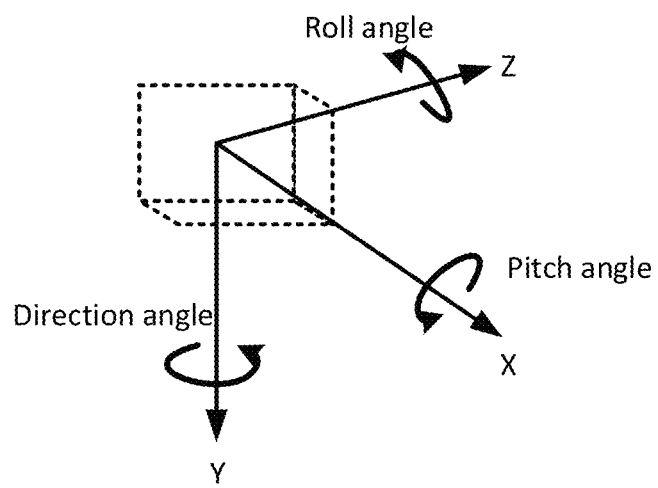
FIG. 5 shows a schematic diagram of attitude angle data according to one embodiment of the present invention.

In one embodiment, the attitude angle data includes a pitch angle tilt, a direction angle pan, and a roll angle roll. FIG. 5 shows a schematic diagram of attitude angle data according to one embodiment of the present invention. The coordinate system shown in FIG. 5 follows a right-hand rule, in which the pitch angle rotates around a X axis, the direction angle rotates around a Y axis, and the roll angle rotates around a Z axis.

It should be noted that the method 300 further includes a step of: calibrating the dynamic vision sensor 100 to determine the calibration parameters of the dynamic vision sensor. Specifically, camera parameters of the dynamic vision sensor are calibrated, to determine a central pixel location and focal length parameters corresponding to the dynamic vision sensor. For example, Zhengyou Zhang calibration method is adopted for camera parameter calibration, but is not limited to this. In addition, the inertial measurement unit of the dynamic vision sensor is calibrated, to determine the inertial calibration parameters. Generally, errors of inertial measurement unit include an axis orthogonal deviation error, a scaling error and a bias, and the existence of these errors will cause errors in calculations of the attitude angle and a heading angle, so it is needed to calibrate the inertial measurement unit. In some embodiments, the coordinate system of the inertial measurement unit takes the camera coordinate system as reference, rotates the IMU in multiple directions and obtains data, and uses a plurality of groups of data for least square solution to obtain values of each inertial calibration parameter. Wherein the calibration of the accelerometer and the magnetometer is mainly realized by ellipsoid fitting, the calibration of the gyro is mean values of data after reaching thermal balance through long-time standing, and the orthogonal deviation error and the scaling error of the gyro are ignored in this calibration. Similarly, the calibration method about the inertial measurement unit is not explained too much here, any calibration method with respect to the camera parameters and the IMU parameters may be combined with the embodiments of the present invention.

Only the example of the inertial calibration parameters according to one embodiment of the present invention is shown here.

For the accelerometer, nine parameters in total, including coordinate rotation parameters (3 coordinate rotation parameters), the scaling parameters (3 scaling parameters) and the biases (3 biases), need to be calibrated, as shown in Table 1.

TABLE 1

Description of calibration parameters of the accelerometer

| Parameter symbol | Description |
| --- | --- |
| $a_1$ | coordinate rotation parameter 1 |
| $a_2$ | coordinate rotation parameter 2 |
| $a_3$ | coordinate rotation parameter 3 |
| $s_x^a$ | X-axis scaling parameter |
| $s_y^a$ | Y-axis scaling parameter |
| $s_z^a$ | Z-axis scaling parameter |
| $b_x^a$ | X-axis bias |
| $b_y^a$ | Y-axis bias |
| $b_z^a$ | Z-axis bias |

For the gyro, three bias parameters need to be calibrated, as shown in Table 2.

TABLE 2

Calibration parameters of the gyro

| Parameter symbol | Description |
| --- | --- |
| $b_x^g$ | X-axis bias |
| $b_y^g$ | Y-axis bias |
| $b_z^g$ | Z-axis bias |

For the magnetometer, 12 parameters in total, including rotation parameters (6 rotation parameters), scaling parameters (3 scaling parameters, $s_z^m$ is temporarily set to 1) and biases (3 biases), need to be calibrated, as shown in Table 3.

TABLE 3

Calibration parameters of the magnetometer

| Parameter symbol | Description |
| --- | --- |
| $\gamma_1$ | coordinate rotation parameter 1 |
| $\gamma_2$ | coordinate rotation parameter 2 |
| $\gamma_3$ | coordinate rotation parameter 3 |
| $\gamma_4$ | coordinate rotation parameter 4 |
| $\gamma_5$ | coordinate rotation parameter 5 |
| $\gamma_6$ | coordinate rotation parameter 6 |
| $s_x^m$ | X-axis scaling parameter (with respect to Z-axis) |
| $s_y^m$ | Y-axis scaling parameter(with respect to Z-axis) |
| $s_z^m$ | Z-axis scaling parameter (set to be 1) |
| $b_x^m$ | X-axis bias |
| $b_y^m$ | Y-axis bias |
| $b_z^m$ | Z-axis bias |

Figure 6:
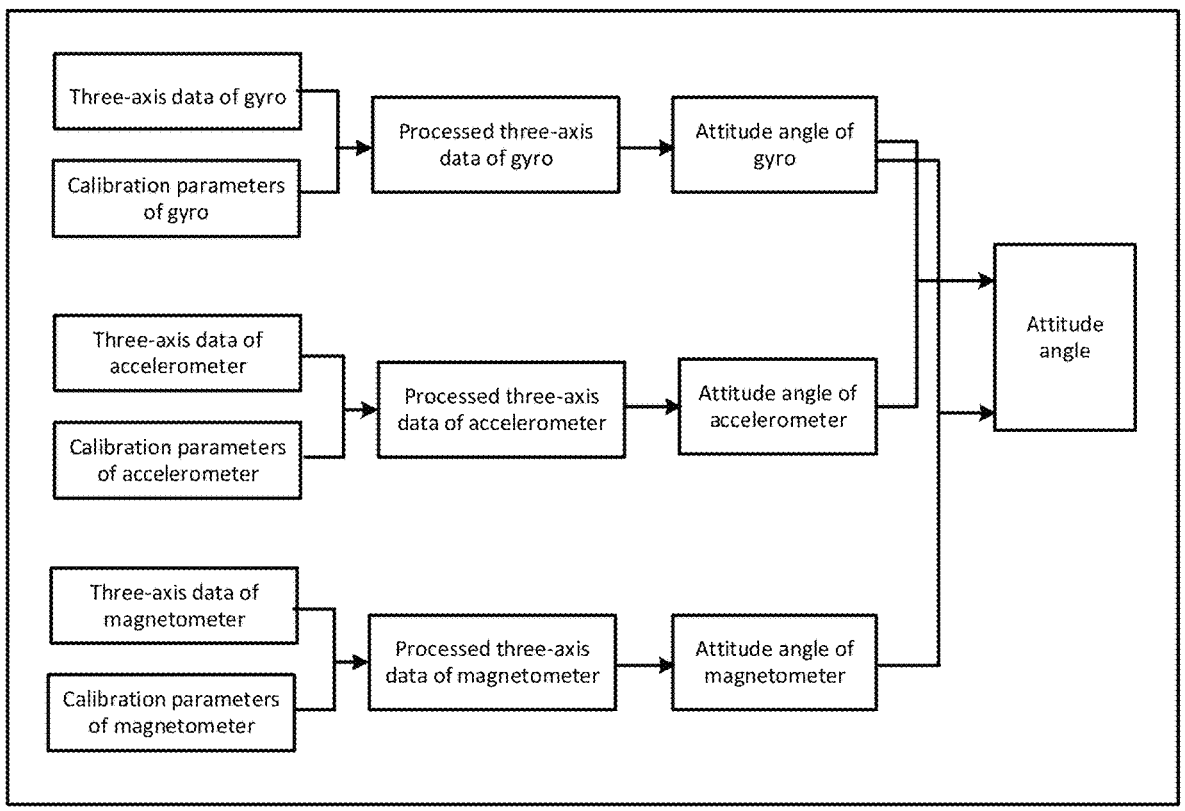
FIG. 6 shows a flow schematic diagram of determining attitude angle data according to one embodiment of the present invention.

In one embodiment according to the invention, the attitude angle data corresponding to each group of inertial measurement parameters are determined, respectively, based on the calibration parameters determined via the above method and each group of inertial measurement parameters within the first duration determined via step S310. Specifically, the attitude angle data corresponding to each group of inertial measurement parameters are calculated through the following steps. As shown in FIG. 6, a flow schematic diagram of determining the attitude angle data according to one embodiment of the present invention is shown. It should be noted that, after a plurality of groups of inertial measurement parameters corresponding to the first duration are acquired, for each group of inertial measurement parameters, the following steps are performed to determine the attitude angle data corresponding to this group of inertial measurement parameters.

In the first step, the acquired inertial measurement parameters are processed by using the calibration parameters of the dynamic vision sensor, to obtain the processed inertial measurement parameters. As mentioned above, the calibration parameters of the dynamic vision sensor include the calibration parameters of the gyro, the calibration parameters of the accelerometer and the calibration parameters of the magnetometer. Three-axis data of the gyro (recorded as (gx, gy, gz)), three-axis data of the accelerometer (recorded as (ax, ay, az)) and three-axis data of the magnetometer (recorded as (mx, my, mz)) are processed by using the above three groups of calibration parameters, respectively, to obtain the processed inertial measurement parameters including the processed three-axis data of the gyro (recorded as (gx', gy', gz')),the processed three-axis data of the accelerometer (recorded as (ax', ay',az')) and the processed three-axis data of the magnetometer (recorded as (mx', my', mz')).

In the second step, the processed three-axis data of the gyro is processed by adopting time difference integration, to generate an attitude angle of the gyro (recorded as (g_tilt, g_pan, g_roll)).

In one embodiment, calculating the attitude angle of the gyro by adopting the time difference integration is represented by the following formulas:

$$g\_tilt_{k+1} = g\_tilt_k + \Delta t \cdot gx'$$

$$g\_pan_{k+1} = g\_pan_k + \Delta t \cdot gy'$$

$$g\_roll_{k+1} = g\_roll_k + \Delta t \cdot gz'$$

It should be noted that each parameter in the formulas has been explained above and will not be repeated here.

In the third step, distribution of the processed three-axis data of the accelerometer and distribution of the processed three-axis data of the magnetometer are processed by adopting a trigonometric function, to generate an attitude angle of the accelerometer (recorded as (a_tilt, a_roll)) and an attitude angle of the magnetometer (recorded as m_pan), respectively.

In one embodiment, calculating the attitude angle of the accelerometer by adopting the trigonometric function is represented by the following formulas:

$$a\_tilt = -\arctan\left(\frac{az'}{\|ax'^2 + ay'^2\|}\right)$$

$$a\_roll = \arctan\left(\frac{ax'}{\|ay'^2 + az'^2\|}\right),$$

and, the attitude angle of the magnetometer is:

$$m\_pan = -\arctan 2(Hy, Hx),$$

wherein, $Hx = -mz' \cdot \cos(a\_tilt) + mx' \cdot \sin(a\_tilt)$ $Hy = my' \cdot \cos(a\_roll) - mxz' \cdot \sin(a\_roll) \cdot \sin(a\_tilt) - mx' \cdot \cos(a\_tilt) \cdot \sin(a\_roll)$ In the fourth step, the attitude angle of the gyro, the attitude angle of the accelerometer and the attitude angle of the magnetometer are processed based on complementary filtering, respectively, to generate the final attitude angle.

In one embodiment, the attitude angle of the gyro and the attitude angle of the accelerometer are complementary filtered to generate tilt and roll; the attitude angle of the gyro and the attitude angle of magnetometer are complementary filtered to generate pan, which can be represented by the following formulas:

$$tilt = k_1 \cdot g\_tilt + (1-k_1) \cdot a\_tilt$$

$$roll = k_1 \cdot g\_roll + (1-k_1) \cdot a\_roll$$

$$pan = k_2 \cdot g\_pan + (1-k_2) \cdot m\_pan$$

Then, in step S330, a transformation matrix is generated based on the determined attitude angle data.

In one embodiment according to the present invention, the transformation matrix is generated in the following manner. Firstly, difference values of the attitude angle data corresponding to each group of inertial measurement parameters are calculated, respectively, to obtain at least one attitude angle difference value. Then, at least one transformation matrix is generated based on the at least one calculated attitude angle difference value. It should be noted that the difference value of the attitude angle data may be recorded as:

$$\Delta tilt = tilt_i - tilt_j, \Delta pan = pan_i - pan_j, \Delta roll = roll_i - roll_j$$

Wherein $tilt_i$, $pan_i$, $roll_i$ and $tilt_j$, $pan_j$, $roll_j$ represent attitude angle data corresponding to two groups of inertial measurement parameters, respectively. For ease of expression, attitude angle data corresponding to one group of inertial measurement parameters is abbreviated as P below, thus the above formulas may be abbreviated as:

$$\Delta P = P_i - P_j.$$

In one embodiment, the procedure of calculating the attitude angle difference value may be simply summarized as: calculating the difference between the attitude angle data of each of other groups of inertial measurement parameters and the attitude angle data of the first group of inertial measurement parameters within a time period corresponding to the first duration, respectively. The procedure of calculating the attitude angle difference value is described in detail by taking FIGS. 4A to 4C as examples below.

In FIG. 4A, the first duration is 10 ms, and at this time, according to the output frequency of the inertial measurement parameters, a t0-t1 time period does not need to be further divided into sub time periods, the difference value between the attitude angle data (recorded as P1) corresponding to t1 moment and the attitude angle data (recorded as P0) corresponding to t0 moment is directly calculated, which is recorded as P1-P0. Similarly, in the next first duration, i.e., t1-t2 time period, the difference value between the attitude angle P2 at t2 moment and the attitude angle P1 at t1 moment is calculated, which is recorded as P2-P1.

In FIG. 4B, the first duration is 30 ms, and at this time, according to the output frequency of inertial measurement parameters, a t0-t3 time period is divided into a t0-t1 sub-time period, a t1-t2 sub-time period and a t2-t3 sub-time period. For the t0-t1 sub-time period, the difference value between the attitude angle data (recorded as P1) corresponding to the t1 moment and the attitude angle data (recorded as P0) corresponding to the t0 moment is calculated, which is recorded as P1-P0; for the t1-t2 sub-time period, the difference value between the attitude angle data (recorded as P2) corresponding to t2 moment and the attitude angle data (recorded as P0) corresponding to t0 moment is calculated, which is recorded as P2-P0; for the t2-t3 sub-time period, the difference value between the attitude angle data (recorded as P3) corresponding to t3 moment and the attitude angle data (recorded as P0) corresponding to t0 moment is calculated, which is recorded as P3-P0.

In FIG. 4C, the first duration is 25 ms, and at this time, according to output frequency of the inertial measurement parameters, a t0-ti time period is divided into a t0-t1 sub-time period, a t1-t2 sub-time period and a t2-t' sub-time period. For the t0-t1 sub-time period, the difference value between the attitude angle data (recorded as P1) corresponding to t1 moment and the attitude angle data (recorded as P0) corresponding to t0 moment is calculated, which is recorded as P1-P0; for the t1-t2 sub-time period, the difference value between the attitude angle data (recorded as P2)corresponding to t2 moment and the attitude angle data (recorded as P0) corresponding to t0 moment is calculated, which is recorded as P2-P0; for the t2-t' sub-time period, the difference value between the attitude angle data (recorded as P') corresponding to t' moment and the attitude angle data (recorded as P0) corresponding to t0 moment, which is recorded as P'-P0.

After the at least one attitude angle difference value is obtained, at least one transformation matrix is generated correspondingly according to the at least one attitude angle difference value. In other words, within the time period corresponding to each first duration, this time period is divided into M sub-time periods based on the output frequency of inertial measurement parameters, and the difference value of attitude angle data corresponding to each sub-time period is calculated, to obtain M attitude angle difference values, and then respective transformation matrix, M transformation matrices in total, is generated based on respective attitude angle difference value.

In one embodiment, the transformation matrix is generated according to the following formula:

$$\underset{2\times 3}{warpMatrix} = \begin{bmatrix} \cos(\Delta\text{roll}) & \sin(\Delta\text{roll}) & (1-\cos(\Delta\text{roll}))\cdot cx - \sin(\Delta\text{roll})\cdot cy - \dfrac{1}{\arctan\left(\dfrac{1}{f}\right)}\cdot \Delta\text{pan} \\ -\sin(\Delta\text{roll}) & \cos(\Delta\text{roll}) & \sin(\Delta\text{roll})\cdot cx + (1-\cos(\Delta\text{roll}))\cdot cy - \dfrac{1}{\arctan\left(\dfrac{1}{f}\right)}\cdot \Delta\text{tilt} \end{bmatrix}$$

Wherein, as mentioned above, Δroll, Δpan, and Δtilt are attitude angle difference values (i.e., three amounts of ΔP), and, cx, cy, and f represent the image center pixel location and the focal length, respectively.

Then, in step S340, this one segment of the event data stream is processed using the transformation matrix to generate the processed event data stream.

In other words, by using at least one transformation matrix within the time period corresponding to the first duration, the event data within a corresponding sub-time period is processed, and the processed event data stream is finally generated. Specifically, the processing of the event data stream using the generated at least one transformation matrix is to process a location of at least one event data in the event data stream respectively to generate the processed location of the event data.

In one embodiment, respective event data is processed by the following formulas:

x_compensated=warpMatrix(0,0)·x+warpMatrix(0,1)·y+warpMatrix(0,2)

y_compensated=warpMatrix(1,0)·x+warpMatrix(1,1)·y+warpMatrix(1,2)

Wherein, x and y are locations of original event data, x_compensated and y_compensated are the processed locations of the event data.

So far, the processing of this segment of the event data stream has been completed. According to one embodiment of the invention, after the processed event data stream is generated, it further includes a step of: generating an image containing motion information using the processed event data stream which is generated. For example, the one frame of image is generated by perform a mapping according to the location information and the timestamp information of the triggered event in the event data stream. Pixel information of pixel points in this image can characterize a coordinate location and a sequence of being triggered of the event data (i.e., pixel units of which brightness change occurs). The method of generating the image using the event data stream will not be repeated here, and any known or future known method may be combined with the embodiments of the present invention.

Figure 7A:
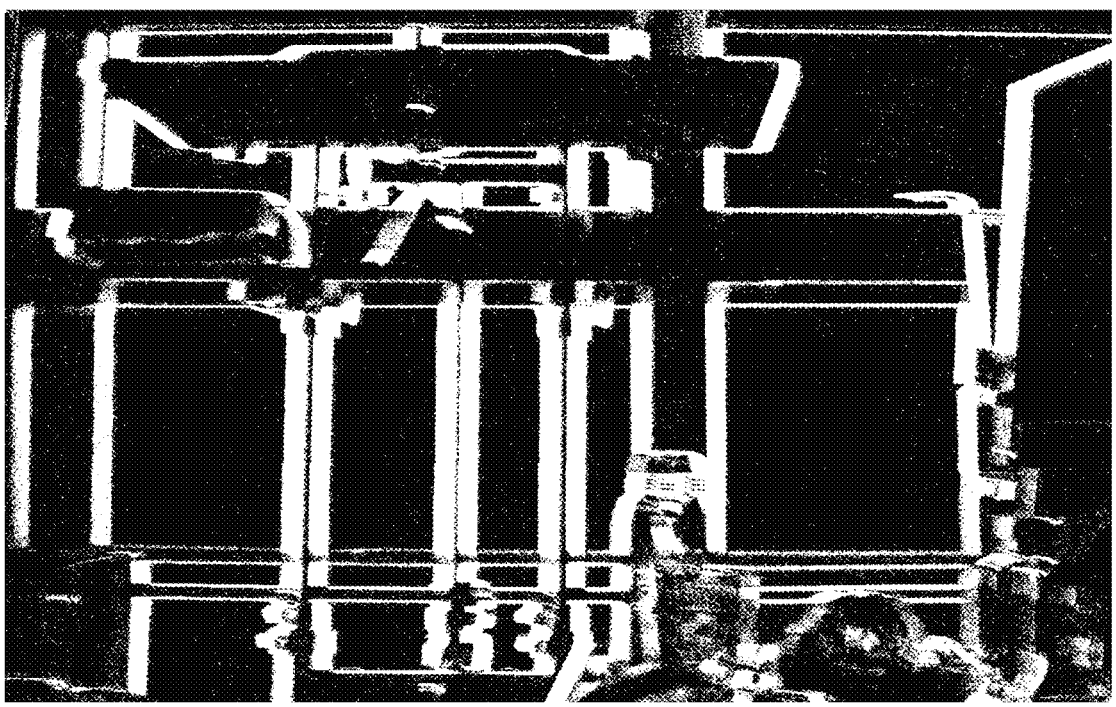
FIGS. 7A and 7B show schematic diagrams of the comparison of optical flow images before and after processing according to one embodiment of the present invention.
Figure 7B:
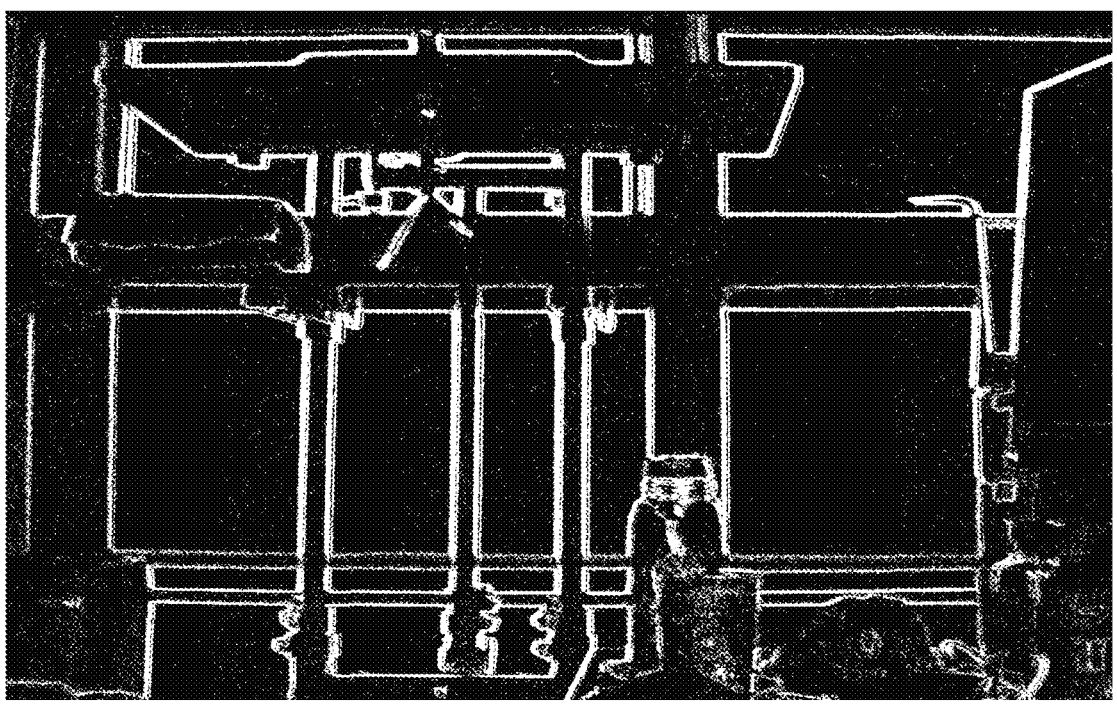

In the processing scheme according to the present invention, the attitude angle data is calculated by the acquired inertial measurement parameters, and the event data output by the dynamic vision sensor is processed using the attitude angle data, that is, the motion compensation on the original event data, which can effectively reduce tailing phenomenon, keep the imaging clear and edges sharp. It is very valuable both for the subsequent algorithm development of slam and the subsequent algorithm development of target detection. As shown in FIG. 7A, it is a optical flow image before processing, that is, a optical flow image generated by the event data stream before processing. It can be seen that some edges will have serious tailing phenomenon when the dynamic vision sensor moves. FIG. 7B is a processed optical flow image, that is, an optical flow image, generated by the event data stream processed through method 300. It can be seen that the tailing phenomenon has been significantly reduced and the edge contour has become clearer and sharper.

With respect to problems of high complexity and serious time-consumption of the existing algorithms, the present disclosure proposes a DVS native point cloud motion compensation scheme based on IMU attitude fusion, which directly perform IMU motion compensation on the output event data by using characteristics of a dynamic vision sensor outputting an asynchronous event data stream, this scheme is simple and effective, and does not depend on estimation of depth of field of a target, thus will not cause serious time-consumption. In addition, since the asynchronous event data stream is processed directly, the processing effect is more real-time. IMU compensation can be carried out on finer time segments to solve the problem of image tailing caused by DVS motion.

A large number of specific details are described in the specification provided herein. However, it can be understood that, the embodiments of the present invention can be practiced without these specific details. In some examples, well-known methods, structures and techniques are not shown in detail so as not to obscure the understanding of this specification.

Similarly, it should be understood that, in order to simplify the present disclosure and help understand one or more of various invention aspects, in the above description of the exemplary embodiments of the present invention, various features of the present invention are sometimes grouped together into a single embodiment, figure, or description thereof. However, the disclosed method should not be interpreted to reflect an intention that the claimed invention claims more features than those of explicitly recorded in each claim. More precisely, as reflected in the following claims, aspects of the invention lie in less than all the features of the single embodiment disclosed above. Therefore, the claims following the detailed description are hereby expressly incorporated into this detailed description, wherein each claim itself is a separate embodiment of the present invention.

Those skilled in the art should understand that the modules or units or components of the apparatus in the example disclosed herein may be arranged in the apparatus as described in the embodiment, or alternatively may be located in one or more apparatuses different from the apparatus in the example. The modules in the preceding example may be combined into one module or, in addition, may be divided into a plurality of sub modules.

Those skilled in the art can understand that the modules in the apparatus in the embodiments can be adaptively changed and provided in one or more apparatuses different from the embodiments. The modules or the units or the components in the embodiments may be combined into one module or unit or component, and in addition, they may be divided into a plurality of sub modules or sub units or sub components. Except that at least some of such features and/or procedures or units are mutually exclusive, all features disclosed in this specification (including accompanying claims, abstract and drawings) and all procedures or units of any method or apparatus disclosed as such may be combined in any combination. Each feature disclosed in the present specification (including accompanying claims, abstract and drawings) may be replaced by an alternative feature providing the same, equivalent or similar purpose unless otherwise expressly stated.

In addition, those skilled in the art can understand that, although some embodiments described herein include some features included in other embodiments rather than other features, the combination of features of different embodiments means that they are within the scope of the present invention and form different embodiments. For example, in the following claims, any one of the claimed embodiments can be used in any manner of combination.

In addition, some of the embodiments are described herein as a method or combination of method elements that can be implemented by a processor of a computer system or by other devices performing the functions. Therefore, a processor having the necessary instructions for implementing the method or the method elements forms a device for implementing the method or the method elements. In addition, the elements of embodiments of the device described herein are examples of devices for implementing functions performed by elements for the purpose of implementing the invention.

As used herein, unless otherwise specified, describing ordinary objects using ordinal words "first", "second", "third" and so on only represents different instances involving similar objects, and is not intended to imply that the objects described as such must have a given order in time, space, ranking or in any other manner.

Although the present invention has been described according to a limited number of embodiments, benefiting from the above description, those skilled in the art understand that other embodiments can be envisaged within the scope of the invention described thereby. In addition, it should be noted that the language used in this specification is selected mainly for the purpose of readability and teaching, rather than for the purpose of explaining or defining the subject matter of the present invention. Therefore, many modifications and changes will be apparent to those skilled in the art without departing from the scope and spirit of the appended claims. For the scope of the present invention, the disclosure of the present invention is illustrative rather than restrictive, and the scope of the present invention is limited by the appended claims.

What is claimed is:

1. A processing method of an event data stream which is from a dynamic vision sensor, the method comprising steps of:
   acquiring inertial measurement parameters which correspond to one segment of the event data stream for generating one frame of image;
   determining attitude angle data based on the acquired inertial measurement parameters and calibration parameters of the dynamic vision sensor;
   generating a transformation matrix based on the determined attitude angle data; and
   processing the one segment of the event data stream using the transformation matrix, to generate the processed event data stream,
   wherein the step of acquiring the inertial measurement parameters, which correspond to the one segment of the event data stream for generating the one frame of image comprises:
   determining whether a first duration of generating the one frame of image is consistent with a second duration of outputting one group of inertial measurement parameters;
   acquiring two groups of inertial measurement parameters within a time period corresponding to the first duration or the second duration, if the first duration is consistent with the second duration;
   acquiring a plurality of groups of inertial measurement parameters within a time period corresponding to the first duration, if the first duration is inconsistent with the second duration and the first duration is an integral multiple of the second duration; and
   acquiring a plurality of groups of inertial measurement parameters within a time period greater than that corresponding to the first duration, and performing interpolation by using the acquired inertial measurement parameters to obtain a plurality of groups of inertial measurement parameters within a time period corresponding to the first duration, if the first duration is inconsistent with the second duration and the first duration is not an integral multiple of the second duration.

2. The method according to claim 1, after the generation of the processed event data stream, further comprises a step of:
   generating the image containing motion information using the processed event data stream which is generated.

3. The method according to claim 1, wherein the step of determining the attitude angle data based on the acquired inertial measurement parameters and the calibration parameters of the dynamic vision sensor comprises:
   determining the attitude angle data corresponding to each group of inertial measurement parameters within the first duration, respectively, based on the calibration parameters and the each group of inertial measurement parameters.

4. The method according to claim 3, wherein the step of generating the transformation matrix based on the determined attitude angle data further comprises:
   calculating difference values of the attitude angle data corresponding to the each group of inertial measurement parameters, respectively, to obtain at least one attitude angle difference value; and generating at least one transformation matrix based on the at least one calculated attitude angle difference value.

5. The method according to claim 4, wherein the step of processing the one segment of the event data stream using the transformation matrix, to generate the processed event data stream comprises:
processing a location of at least one event data in the event data stream using the at least one generated transformation matrix, to generate the processed location of the event data, respectively.

6. The method according to claim 1, wherein the inertial measurement parameters comprise three-axis data of a gyro, three-axis data of an accelerometer and three-axis data of a magnetometer.

7. The method according to claim 6, wherein the step of determining the attitude angle data based on the acquired inertial measurement parameters and the calibration parameters of the dynamic vision sensor further comprises:
processing the acquired inertial measurement parameters by using the calibration parameters of the dynamic vision sensor, to obtain the processed inertial measurement parameters, the processed inertial measurement parameters comprising the processed three-axis data of the gyro, the processed three-axis data of the accelerometer and the processed three-axis data of the magnetometer;
processing the processed three-axis data of the gyro by adopting time difference integration, to generate an attitude angle of the gyro;
processing distribution of the processed three-axis data of the accelerometer and the processed three-axis data of the magnetometer by adopting a trigonometric function, to generate an attitude angle of the accelerometer and an attitude angle of the magnetometer, respectively; and
processing the attitude angle of gyro, the attitude angle of the accelerometer and the attitude angle of the magnetometer based on complementary filtering, respectively, to generate a final attitude angle.

8. The method according to claim 4, wherein the step of calculating the difference values of the attitude angle data corresponding to the each group of inertial measurement parameters, respectively, to obtain the at least one attitude angle difference value comprises:
calculating difference values between attitude angle data of a first group of inertial measurement parameters and attitude angle data of each of other group of inertial measurement parameters, respectively.

9. The method according to claim 1, further comprises a step of:
calibrating the dynamic vision sensor to determine the calibration parameters of the dynamic vision sensor.

10. The method according to claim 9, wherein the step of calibrating the dynamic vision sensor to determine the calibration parameters of the dynamic vision sensor comprises:

performing camera parameter calibration on the dynamic vision sensor to determine a central pixel location and focal length parameters corresponding to the dynamic vision sensor; and
performing inertial measurement unit calibration on the dynamic vision sensor to determine inertial calibration parameters.

11. The method according to claim 10, wherein the transformation matrix is generated according to the following formula:

$$warpMatrix_{2\times 3} = \begin{bmatrix} \cos(\Delta roll) & \sin(\Delta roll) & (1-\cos(\Delta roll))\cdot cx - \sin(\Delta roll)\cdot cy - \dfrac{1}{\arctan\left(\dfrac{1}{f}\right)}\cdot \Delta pan \\ -\sin(\Delta roll) & \cos(\Delta roll) & \sin(\Delta roll)\cdot cx + (1-\cos(\Delta roll))\cdot cy - \dfrac{1}{\arctan\left(\dfrac{1}{f}\right)}\cdot \Delta tilt \end{bmatrix}$$

wherein, $\Delta roll$, $\Delta pan$ and $\Delta tilt$ are attitude angle difference values, and, cx, cy, and f represent the image center pixel location and the focal length, respectively.

12. The method according to claim 11, wherein the step of processing the one segment of the event data stream using the transformation matrix comprises:

x_compensated=warpMatrix(0,0)·x+warpMatrix(0,1)·y+warpMatrix(0,2)

y_compensated=warpMatrix(1,0)·x+warpMatrix(1,1)·y+warpMatrix(1,2)

wherein, x and y are locations of original event data, x_compensated and y_compensated are the processed locations of the event data.

13. A dynamic vision sensor comprises:
an event detection unit suitable for outputting an event data stream;
an inertial measurement unit suitable for outputting inertial measurement parameters; and
a motion compensation unit coupled with the event detection unit and the inertial measurement unit, respectively, and suitable for processing the event data stream based on the inertial measurement parameters, to generate the processed event data stream, wherein the motion compensation unit is configured to perform the method according to claim 1.

14. The dynamic vision sensor according to claim 13, further comprises:
a framing unit is coupled with the motion compensation unit and is suitable for generating an image containing motion information according to the processed event data stream.

15. A computing apparatus comprises:
one or more processors;
a memory; and
one or more programs, wherein the one or more programs are stored in the memory and configured to be executed by the one or more processors, and the one or more programs include instructions for executing the method according to claim 1.

16. A non-transitory computer-readable storage medium storing one or more programs, the one or more programs comprising instructions, the instructions, when being executed by a computing apparatus, cause a computing apparatus to execute the method according to claim 1.

* * * * *